(12) United States Patent
De Mers et al.

(10) Patent No.: US 11,138,987 B2
(45) Date of Patent: Oct. 5, 2021

(54) SYSTEM AND METHOD TO DISTINGUISH SOURCES IN A MULTIPLE AUDIO SOURCE ENVIRONMENT

(71) Applicant: HONEYWELL INTERNATIONAL INC., Morris Plains, NJ (US)

(72) Inventors: Robert E De Mers, Nowthen, MN (US); David J Dopilka, Glendale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 611 days.

(21) Appl. No.: 15/089,970

(22) Filed: Apr. 4, 2016

(65) Prior Publication Data
US 2017/0287500 A1    Oct. 5, 2017

(51) Int. Cl.
| | |
|---|---|
| G10L 25/78 | (2013.01) |
| G10L 15/08 | (2006.01) |
| G10L 15/22 | (2006.01) |
| G10L 21/028 | (2013.01) |
| G10L 19/018 | (2013.01) |
| G10L 21/0208 | (2013.01) |

(52) U.S. Cl.
CPC ............ *G10L 21/028* (2013.01); *G10L 15/08* (2013.01); *G10L 15/22* (2013.01); *G10L 19/018* (2013.01); *G10L 21/0208* (2013.01); *G10L 25/78* (2013.01)

(58) Field of Classification Search
CPC ........... G10L 15/20; G10L 2021/02161; G10L 2021/02165; G10L 21/0272; G10L 21/028; G10L 25/84; G10L 25/81

USPC ...................................... 704/231, 233, 270.1
See application file for complete search history.

(56) References Cited

U.S. PATENT DOCUMENTS

| | | | |
|---|---|---|---|
| 8,103,646 B2* | 1/2012 | Brown | G06F 16/78 |
| | | | 707/705 |
| 8,626,498 B2 | 1/2014 | Lee | |
| 8,713,593 B2* | 4/2014 | Humphrey | G06Q 30/02 |
| | | | 725/18 |
| 2003/0018479 A1 | 1/2003 | Oh et al. | |
| 2006/0069551 A1 | 3/2006 | Chen et al. | |
| 2011/0307253 A1* | 12/2011 | Lloyd | G10L 15/20 |
| | | | 704/233 |
| 2012/0022869 A1* | 1/2012 | Lloyd | G10L 15/30 |
| | | | 704/244 |

(Continued)

FOREIGN PATENT DOCUMENTS

WO    2016016387 A1    2/2016

OTHER PUBLICATIONS

Juang et al.; On the Use of Bandpass Liftering in Speech Recognition; Jul. 1987.

(Continued)

*Primary Examiner* — Richemond Dorvil
*Assistant Examiner* — Rodrigo A Chavez
(74) *Attorney, Agent, or Firm* — Lorenz & Kopf, LLP

(57) ABSTRACT

A system and method capable of distinguishing sources in a multiple source environment is provided. The system receives an audio signal comprising an audio tag, a desired audio signal and an undesired audio signal. Based on the audio tag, the system eliminates the undesired audio signal and identifies an intended command in the desired audio signal. The system generates a command for an external device based on the intended command.

15 Claims, 2 Drawing Sheets

(56) References Cited

U.S. PATENT DOCUMENTS

| | | |
|---|---|---|
| 2014/0108020 A1 | 4/2014 | Sharma et al. |
| 2014/0126736 A1 | 5/2014 | Gauger, Jr. et al. |
| 2014/0270194 A1* | 9/2014 | Des Jardins .......... G10L 19/018 381/56 |
| 2014/0350927 A1 | 11/2014 | Yamabe et al. |
| 2016/0042746 A1 | 2/2016 | Fujieda |

OTHER PUBLICATIONS

Qi; Real-Time Adaptive Noise Cancellation for Automatic Speech Recognition in a Car Environment; 2008.
Extended EP Search Report for Application No. 17157744.8-1901 dated Sep. 6, 2017.
"Amazon Echo", Wikipedia, Mar. 28, 2016, XP002773031, retrieved from the Internet: URL: https://en.wikipedia.org/w/index.php?title+Amazon_Echo&oldid=712292354 [retrieved on Aug. 17, 2017].
Philipp Jahner, Star Trek: "Hello Computer", Youtube Apr. 30, 2010, XP002773032, retrieved from the Internet: URL: https://www.youtube.com/watch?v=hShY6xZWVGE [retrieved on Aug. 17, 2017].

* cited by examiner

SYSTEM AND METHOD TO DISTINGUISH SOURCES IN A MULTIPLE AUDIO SOURCE ENVIRONMENT

TECHNICAL FIELD

Embodiments of the subject matter described herein relate generally to audio processing systems and methods, and, more particularly, to an audio system and method capable of distinguishing sources in a multiple audio source environment.

BACKGROUND

In some speech recognition systems, a single audio capture device, such as a microphone or microphone panel, captures the speech emitted by multiple audio sources. In these systems, the audio capture device generally commingles the multiple audio signals emitted by the multiple audio sources and produces therefrom a collective audio signal provided to a system downstream.

Depending on the application, the system receiving the collective audio signal may assign varying priorities to the varying sources; in addition, the system may dynamically vary priorities for audio sources. Accordingly, effective use of the collective audio signal may require separating out the contributing audio signals, according to their respective audio sources. In one example, the collective audio signal may include words that are system commands, and it may be imperative for the receiving system to only respond to the commands from one audio source. In another example, the collective audio signal again may include words that are system commands, and the receiving system may be required to dynamically switch among audio sources that it responds to. Consequently, distinguishing sources in a multiple source environment is desired. The desired audio system distinguishes among audio sources contributing to a collective audio signal.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

An audio system is provided, comprising: a memory device for storage of audio processing algorithms and audio tags; a processor coupled to the memory device, the processor configured to (i) receive an audio signal comprising an audio tag, a desired audio signal and an undesired audio signal and, (ii) based on the audio tag, eliminate the undesired audio signal and identify an intended command.

Also provided is an audio processing method, the method comprising: receiving, from an audio capture device, an audio signal comprising an audio tag, desired audio signal and undesired audio signal; processing the audio signal, using audio processing algorithms stored in a memory device, to eliminate the undesired audio signal based on the audio tag; and generating a command for an external device, wherein the command is (i) responsive to the desired audio signal, and (ii) exclusive of the undesired audio signal.

Another audio system is provided, comprising: a memory device comprising audio processing algorithms; an audio capture device providing an audio signal comprising one or more from the set including an audio tag, a desired audio signal, and undesired audio signal; a processor coupled to the memory device and the audio capture device, the processor configured to (i) receive the audio signal, (ii) identify an audio tag in the audio signal, and (iii) when the audio signal comprises the desired audio signal, identify an intended command in the audio signal.

Other desired features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

Figure 1:
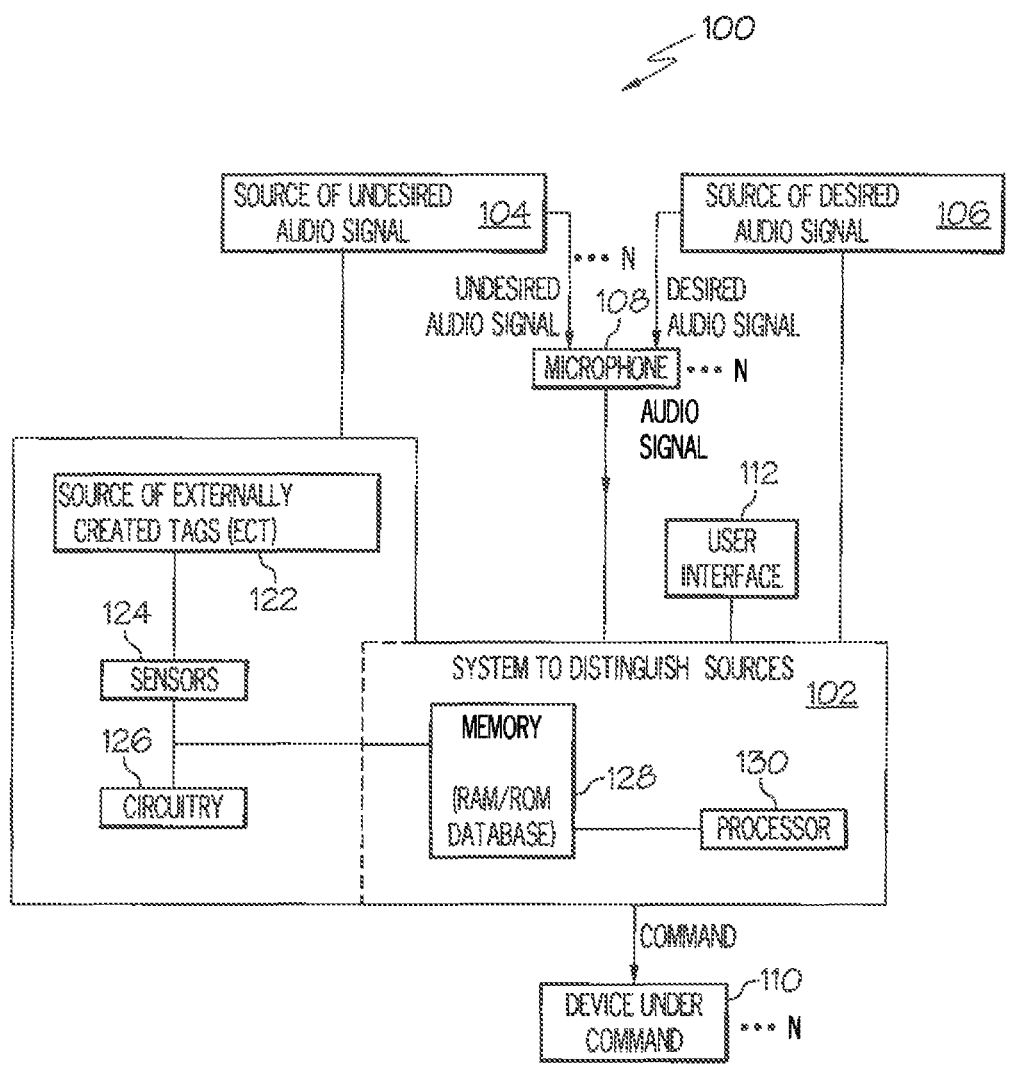
FIG. 1 is a block diagram of a system to distinguish sources in a multiple source environment, in accordance with an embodiment.

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

Techniques and technologies may be described herein in terms of functional and/or logical block components and with reference to symbolic representations of operations, processing tasks, and functions that may be performed by various computing components or devices. Operations, tasks, and functions are sometimes referred to as being processor-executed, computer-executed, computerized, software-implemented, or computer-implemented.

In practice, one or more processor devices can carry out the described operations, tasks, and functions by manipulating electrical signals representing data bits at memory locations in the processor electronics of the display system, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The embodiment described herein is merely an example and serves as a guide for implementing the novel systems and methods herein in any audio communication application having multiple audio sources. It is readily appreciated that audio communication systems may be designed to meet a plurality of application-specific standards beyond the scope of the examples presented below. For the sake of brevity, conventional techniques related to audio processing, speech processing, sensors, and other functional aspects of certain systems and subsystems (and the individual operating components thereof) may not be described in detail herein. In addition, certain terminology may also be used in the following description for the purpose of reference only. Accordingly, the examples presented herein are intended as non-limiting.

As an overview, an audio communication system capable of distinguishing among multiple sources is described below. The audio communication system provided receives a collective audio signal comprising audio signals transmitted from multiple sources; the multiple sources may have transmitted respective audio signals in concurrent, overlapping, or sequential order. Audio tags are employed to identify audio signal sources. In an encoding and decoding approach, the collective audio signal is processed to identify and eliminate all undesired audio signals prior to performing speech recognition on the audio signal remaining (i.e., the desired audio signal), advantageously ensuring that speech recognition or further processing may be performed on only the audio signal from an intended or desired audio source.

In the following example, speaker devices are the sources of undesired audio signals a person is the source of a desired audio signal, and commands are generated for an external device based only upon audio signals (speech) from the person. However, one with skill in the art will readily appreciate that desired audio signals and/or undesired audio signals may be transmitted by a variety of combinations of devices and/or people. Additionally, the below described system and method are operable for communication environments with sources of audio signals placed in a variety of locations, such as, in enclosed spaces, unenclosed spaces, throughout a room, and in a small enclosed space, such as a helmet.

Figure 2:
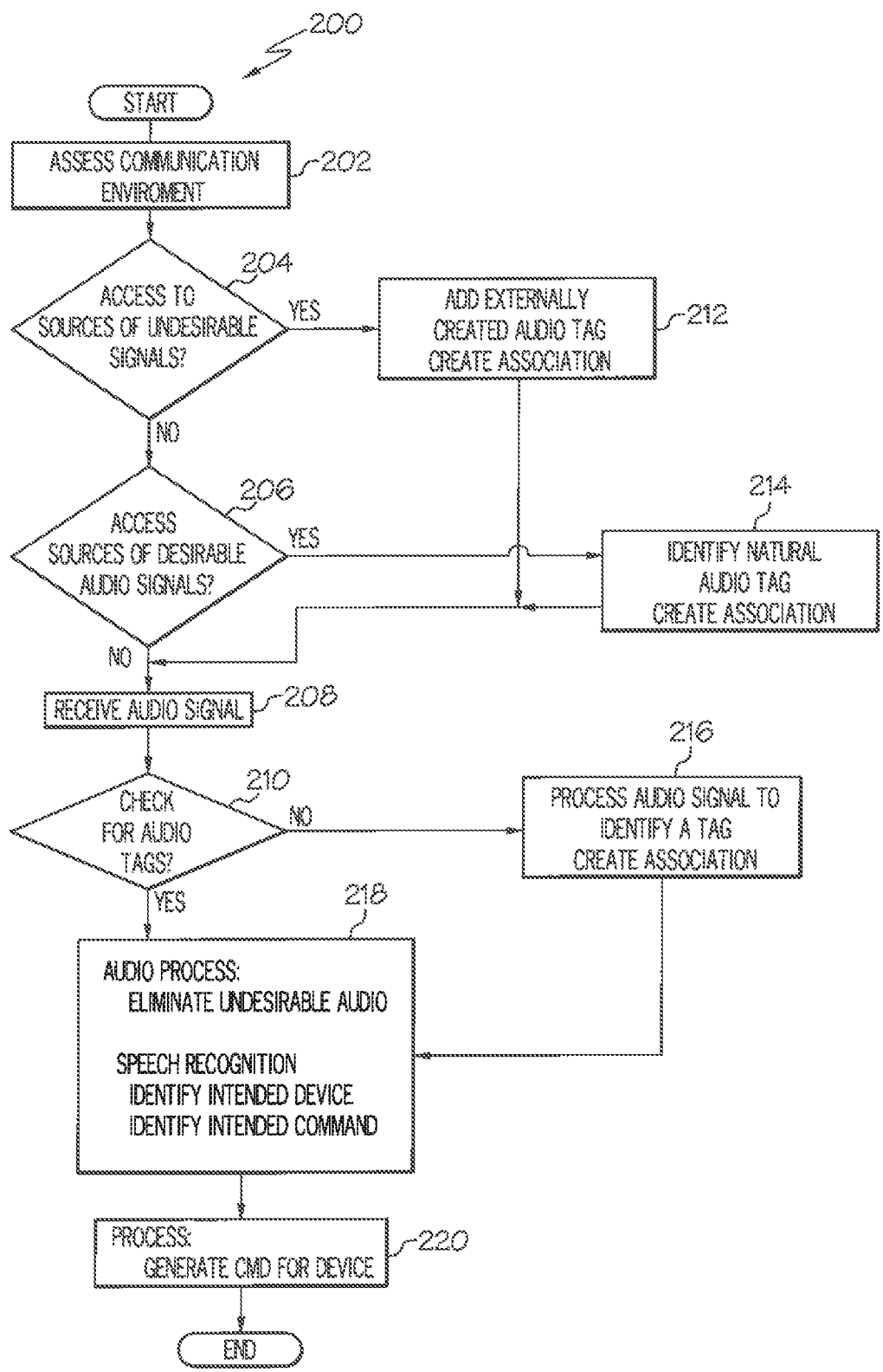
FIG. 2 is a flow diagram illustrating a process for distinguishing sources in a multiple source environment, in accordance with an embodiment.

FIG. 1 provides an exemplary block diagram and FIG. 2 provides an exemplary flow chart for a system to distinguish sources in a multiple source environment. With reference to FIG. 1, the system to distinguish sources 102 comprises a processor 130, source of externally created audio tags 122, and memory device 128. In some embodiments, the system to distinguish sources 102 additionally comprises sensors 124 and circuitry 126. One or more sources of undesired audio signals 104 and one source of a desired audio signal 106 each transmit audio signals. An audio capture device, such as one or more microphones 108, is operatively coupled to the system to distinguish sources 102; the audio capture device detects or captures separately-sourced audio transmissions and converts the audio transmissions into a collective audio signal suitably formatted for processing by the system to distinguish sources 102. The system to distinguish sources 102 is operatively coupled to one or more devices under command 110. The components of the system to distinguish sources 102 are described in detail below.

In the embodiment shown in FIG. 1, the source of undesired audio signal 104 and the source of desired audio signal 106 are coupled to the system to distinguish sources 102. As mentioned above, the sources of audio signals may comprise any combination of audio signal generating sources, such as speaker devices and humans. It will be appreciated that the speaker devices (one to a plurality) may be implemented using any one of numerous known speaker devices or transducer devices suitable for generating audio signals that are detectable by an audio capture device such as a microphone 108. Although shown coupled to the system to distinguish sources 102 in FIG. 1, in some embodiments the sources of audio signals are not coupled to the system to distinguish sources 102. Functionality of the provided embodiments is described in more detail below.

The processor 130 may be implemented or realized with a variety of components, such as, a general purpose processor device, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

In practice, processor 130 may further include or cooperate with system control computers, navigational equipment, memory devices (such as memory device 128), power supplies, storage devices (such as databases), interface cards, and other standard components known in the art. In this respect, the functionality attributed to processor 130 may be distributed among processor components. In addition, processor 130 may include or cooperate with any number of software models, software programs (e.g., audio processing programs, speech recognition programs, gesture interpretation programs, display programs to generate visual feedback on a display unit, etc.) or instructions designed to carry out the various methods, process tasks, and calculations described.

Memory device 128 is coupled to the processor 130 such that the processor 130 can read information from, and write information to, the memory device 128. Memory device 128 can be realized as RAM memory, flash memory, EPROM memory, EEPROM memory, registers, a hard disk, a removable disk, a CD-ROM, or any other form of storage medium known in the art. In the alternative, the memory device 128 may be integral to processor 130. Memory device 128 may store non-transitory computer readable instructions for operating the system to distinguish sources 102. In addition, the memory device may maintain program code associated with various functional or logical module/components of the system described herein.

The system to distinguish sources 102 employs encoding/decoding techniques using audio tags to identify and eliminate undesired audio signals from the collective audio signal. Audio tags may be audible, sub audible, and/or super audible carrier signals that are overlaid on the audio signals generated by a respective source. In an alternative, audio tags may be a separate radio frequency signal or data packet associated with a respective source of audio signals. Audio tags comprise at least one signal characteristic from the set of signal characteristics including: analog, digital, continuous, pulsed, patterned, audible, sub audible and super audible. In operation, the system to distinguish sources 102 creates or identifies, for each audio signal source of a plurality of audio signal sources, a unique audio tag, and an association between each unique audio tag and respective audio signal source. The association is then stored for reference during operation of the system to distinguish sources 102.

Audio tags may be externally created or naturally occurring. The source of externally created audio tags 122 is a source of application specific audio tags used for identifying sources of audio signals. Depending upon the application, the unique externally created audio tags may be added to respective sources of audio signals at a prior location and/or prior time, or may be added real-time, as the system to distinguish sources 102 operates.

Naturally occurring audio tags also may be identified a priori or during operation of the system to distinguish sources 102. Various calibration techniques, employing, for example, sensors 124 and circuitry 126, may be used to identify naturally occurring audio tags. Naturally occurring audio tags may comprise many of the same audio features as the externally created audio tags, described above, and may further vary depending on source type. Moreover, naturally occurring audio tags associated with device audio sources (such as audio speakers, as opposed to human audio sources), comprise audio in frequencies within a range of about 30-8000 Hz, lower audio quality than that of human speech, and digital audio artifacts like humming sounds (as used herein, audio quality comprises harmonic content of a sound and associated dynamic characteristics of the sound). In contrast, naturally occurring audio tags in human speech may comprise frequency content outside of the 30-8000 Hz range, higher audio quality than audio speakers provide, and digital and/or analog artifacts caused by, for example, increased air pressure on a microphone 108.

As described above, unique audio tags are used to distinguish individual sources of audio signals; therefore, the association between an audio tag and its audio signal source is a unique data pairing useful in the encoding and decoding process of identifying audio sources. Once an audio tag is added to an audio signal source, this pairing is referred to as "audio tag data" and stored for reference. The storage format of the audio tag data may be, for example, a data structure or a lookup table. In an embodiment, audio tag data is arranged and stored in the memory device 128 as a data structure, comprising [audio tag: source].

In some embodiments, the system to distinguish sources 102 has access to at least one of: the source of undesired audio signal and the source of desired audio signal. In these embodiments, prior to operation, the system to distinguish sources 102 either (i) adds unique externally created audio tags to the one or more sources of the undesired audio signal or (ii) identifies a naturally occurring audio tag associated with the source of the desired audio signal. In operation of these embodiments, the system to distinguish sources 102 is either (i) filtering out undesired audio signals by recognizing undesired sources based on their audio tags, or (ii) filtering out undesired audio signals by recognizing a desired audio signal source by its' "desired" audio tag, and eliminating all audio signals from sources not having the desired audio tag. In embodiments in which the system to distinguish sources 102 has access to the source of desired audio signal; audio signals transmitted from the source of desired audio signal may be processed to identify a naturally occurring audio tag associated with the source of desired audio signal. For example, a person speaks into the system until the system to distinguish sources 102 identifies a voice pattern or other audio quality characteristic to use as the naturally occurring audio tag. The process then creates an association between the naturally occurring tag and the source of desired audio signal, and stores the association in memory device 128.

In other embodiments, the system to distinguish sources 102 does not have access to any sources of the audio signal (neither the source(s) of undesired audio signal 104, or the source of desired audio signal 106); in such embodiments, the system to distinguish sources 102 audio processes the collective audio signal to identify naturally occurring audio tags therein, and then sorts or separates the audio signal in accordance with the identified naturally occurring audio tags. The identified naturally occurring audio tags are associated with audio sources and the associations are stored. In these embodiments, calibration techniques using various combinations of sensors 124 and circuitry 126 may be employed to assist the processor 130 in identifying sources of audio signals. A first non-limiting example includes placing sensors 124 and circuitry 126 on a power line of a speaker to detect when the speaker is receiving power. A second non-limiting example includes employing multiple sensors 124 coupled to the processor 130; the sensors 124 spatially arranged, such that each incoming audio signal is detected by multiple sensors 124. The audio signals have different travel times to each of the multiple sensors. The resultant sensor data is triangulated by the processor 130 and processed with the collective audio signal to locate the source and then use the source location to determine whether the source is likely a person (source of desired audio signals) or a speaker (source of undesired audio signals). Therefrom, undesired audio signal may be identified and eliminated from the audio signal prior to speech processing and command generation.

As used herein, audio processing comprises audio processing and speech recognition. The required audio processing software and speech recognition software may be stored in memory device 128. A variety of currently available audio processing and speech recognition software products may be used to process the audio signal, parse it to eliminate undesired audio signal and generate a text stream based on only desired audio signal. Non-limiting examples of speech recognition algorithms include hidden Markov models, dynamic time warping (DTW), neural networks, deep neural networks, or the like. The processor 130 and memory device 128 cooperate to further process the text stream with the undesired audio signal removed (i.e., the text stream based on desired audio signal) to identify (i) an intended command, and (ii) an intended device under command 110. In this manner, processor 130 may generate a command from the audio signal that is responsive to the desired audio signal and exclusive of the undesired audio signal.

A user interface 112 may optionally be coupled to the processor 130 and memory device 128. User interface 112 is configured to receive input from a user and, in response to the user input, supply command signals to the processor 130. The user interface 112 may comprise any combination of various known user interface devices, such as: a voice recognition device, a gesture recognition device, a keyboard, a touch sensitive screen, and a cursor control device, such as a mouse, trackball, joystick, or combination of buttons, switches, or knobs configured to receive user input. In some embodiments the user interface 112 and a display device (not shown) may be combined, for example, as a touch sensitive screen.

In some embodiments, the system to distinguish sources 102 employs enable signals provided via user interface 112. For example, a first enable signal may be required by the processor 130 to enable audio processing of the incoming audio stream audio signal, and/or, a second enable signal may be required by the processor 130 to generate (based on an intended command) the command for the external device under command 110. A variety of enable techniques may be employed. As a non-limiting example, the first enable signal may comprise toggling a push-to-talk switch, and the second enable may comprise toggling another switch, or a gesture interpretation. In other embodiments, the system to distinguish sources 102 employs enable signals provided by the audio tags described herein; for example, an audio tag associated with a source of desired audio signals may serve as an enable signal.

In FIG. 2, an exemplary process for distinguishing sources in a multiple source environment is described. It is to be understood that the provided process steps may be differently arranged, and process steps may be added or combined without straying from the inventive concept provided herein. The process begins by assessing the communication environment at STEP 202 to determine whether the system to distinguish sources 102 (hereinafter referred to as "the system") has access to the source of undesired audio signal (STEP 204) and to determine whether the system has access to the source of a desired audio signal (STEP 206). When the system has access to a source of the undesired audio signal, the processor commands a source of externally created audio tags 122 to add a unique externally created audio tag (ECT) to the source of undesired audio signal, and an association is created between the ECT and the respective undesired audio signal (STEP 212). It is to be understood that, when the communication environment contains a plurality of sources of undesired audio signals, each source of undesired audio signals of the plurality of sources of undesired audio signals is assessed for system control, each source of undesired audio signals of the plurality of sources of undesired audio signals has a unique ECT added and association created thereto, and each association is stored in memory device 128 for reference.

In STEP 214, when a source of audio signals is a person, and the system has a-priori access to the person, the system may calibrate the person's speech (audio signals). In the present example, the source of the desired audio signals is a person. The system calibrates the person's speech by audio processing samples of audio signals from the person to identify a naturally occurring tag. As described above, this process may employ calibration techniques using sensors 124 and circuitry 126. Upon identifying a naturally occurring tag, an association is created and between the naturally occurring tag and the source of desired audio signal; the association is stored in memory device 128 for reference.

At STEP 208, a collective audio signal is received from an audio capture device, such as one or more microphones 108. The audio signal may comprise any combination of: an audio tag, a desired audio signal, and one or more undesired audio signals. At STEP 210, the audio signal is processed to check for audio tags present. Checking for audio tags present comprises referencing the lookup table of associations between audio tags and sources that has been stored in memory device 128, to identify audio tags. When an audio tag in the audio signal is located in the memory device 128, the stored association provides the respective audio source. As mentioned above, in some embodiments, at STEP 210, a first enable signal may be required to be asserted to initiate audio processing to check for audio tags.

If one or more audio tags are present in the audio signal at STEP 210, the audio signal is audio processed to (i) determine whether a desired audio signal is present and (ii) to eliminate any undesired audio signals in STEP 218. The processor 130 may reference audio processing algorithms (including speech recognition algorithms) stored in memory device 128 to perform audio processing steps. As mentioned above, eliminating undesired audio signals may be performed in at least two methodologies. First, eliminating undesired audio signals may comprise using audio tags associated with sources of undesired audio signal to identify and filter respective undesired audio signals out of the audio signal, leaving behind only a remaining desired audio signal. And, second, eliminating undesired audio signals may comprise using a desired audio tag associated with a source of desired audio signals as an exclusive filter such that audio signals without the desired audio tag are excluded or filtered out of the audio signal. Regardless of the methodology performed, any undesired audio signals are eliminated from the collective audio signal using audio tags, and what remains is the desired audio signal. The desired audio signal may be further audio processed (using speech recognition software) to identify an intended command and an intended external device under command 110 for the command in STEP 218.

In STEP 220, the results of STEP 218 are processed, and an identified "intended command" may be used to generate a command for an external device (device under command 110), wherein the command is exclusive of undesired audio signals and responsive to only a desired audio signal. As mentioned above, in some embodiments, at STEP 220, a second enable signal may be required to be asserted to generate a command in STEP 220. Where a second optional enable is employed, the second enable must be asserted for the process 200 to generate a command based on the intended command from step 218. The device under command 110 may be any external device; a non-limiting example is a display unit displaying a menu system. In which case, the generated command may be to select an item on the menu system.

If audio tags are not present in the audio signal at STEP 210, the audio signal is processed in STEP 216 to identify a naturally occurring audio tag and associate it with a source. A naturally occurring audio tag may be present in the undesired audio signal and/or in the desired audio signal. Processing continues in STEP 216 until either (i) a naturally occurring audio tag is associated with a source determined to be a source of desired audio signals, or (ii) for all undesired audio signals determined present in the audio signal, naturally occurring audio tags are associated with their respective sources. Associations are created and stored as described herein. The process of identifying naturally occurring audio tags in this step is similar to the process of identifying the naturally occurring audio tag when the system has access to a source of desired audio signal described in STEP 214 above; various combinations of sensors 124 and circuitry 126 may be employed. In addition, algorithms for locating sources may be performed. For example, to triangulate signals and identify source locations, the system may measure frequency content with respect to the range of about 30-8000 Hz, and/or detect digital and/or analog artifacts caused by, for example, increased air pressure on a microphone. At the completion of STEP 216, audio processing may be performed at STEP 218.

Thus, there has been provided a system and method capable of distinguishing sources in a multiple source environment. The system and method receives an audio signal comprising an audio tag, a desired audio signal and an undesired audio signal. Based on the audio tag, the system eliminates the undesired audio signal and identifies an intended command in the desired audio signal. The system generates a command for a device under command that is responsive to the intended command.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An audio system, comprising:
   a memory device comprising a speech recognition algorithm and audio tags;
   a processor coupled to the memory device, and to at least one of: a source of undesired audio signal and a source of desired audio signal, the source of the undesired audio signal and the source of the desired audio signal being separate, the processor configured to
   (i) determine when (a) it has access to the source of undesired audio signals;
   (ii) determine when (b) it has access to the source of desired audio signals;
   (iii) associate a respective audio tag with the source of desired audio signal based on (a) and (b), wherein the audio tag is overlaid on the respective audio signal, the audio tag being a carrier signal that is one of: audible, sub audible, and super audible;
   (iv) receive a collective audio signal comprising speech emitted from the source of undesired audio, referred to as an undesired audio signal, and speech emitted from the source of desired audio signal, referred to as a desired audio signal, the undesired audio signal and desired audio signal being concurrent;
   (v) based on the audio tag, eliminate the undesired audio signal from the collective audio signal; and
   (vi) responsive to eliminating the undesired audio signal, use the speech recognition algorithm to identify an intended command in the collective audio signal with the undesired audio signal eliminated.

2. The audio system of claim 1, wherein the audio tag is an externally created audio tag (ECT).

3. The audio system of claim 2, further comprising a source of ECTs, and wherein the processor is further configured to (i) command the source of ECTs to add the ECT to the source of the undesired audio signal, (ii) create an association between the ECT and the source of undesired audio signal, and (iii) store the association in the memory device.

4. The audio system of claim 1, wherein the audio tag is a naturally occurring tag (NT), and the processor is further configured to process the audio signal from the source of the desired audio signal to identify the naturally occurring audio tag (NT) as unique to the source of desired audio signal, create the association between the NT and the source of the desired audio signal, and store the association in the memory device.

5. The audio system of claim 4, wherein the processor is further configured to process the audio signal to (i) identify the NT therein, and wherein eliminating the undesired audio signal from the audio signal comprises eliminating audio signal not having the NT.

6. The audio system of claim 5, further comprising a sensor coupled to the processor and the source of desired audio signal.

7. The audio system of claim 6, wherein the processor is further configured to:
   audio process the desired audio signal to identify therein an intended device associated with the intended command; and
   generate a command that is responsive to the intended command and intended device.

8. The audio system of claim 3, wherein the ECT comprises at least one signal characteristic selectively from the set of signal characteristics including: analog, digital, continuous, pulsed, patterned, audible, sub audible and super audible.

9. The audio system of claim 1, wherein
   the source of undesired audio signals is a speaker device and the source of desired audio signals is a person.

10. The audio system of claim 1, wherein
    the source of undesired audio signals is a first speaker device and the source of desired audio signals is second speaker device.

11. The audio system of claim 1, wherein
    the source of undesired audio signals is a first person and the source of desired audio signals is second person.

12. An audio processing method, the method comprising:
    at a system to distinguish sources having a source of undesired audio signals and a separate source of desired audio signals,
    determining when (a) it has access to the source of undesired audio signals;
    determining when (b) it has access to the source of desired audio signals;
    associating a respective audio tag with one of the source of undesired audio signal and source of desired audio signal based on (a) and (b), wherein the audio tag is a carrier signal overlaid on the respective audio signal, the audio tag being one of: audible, sub audible, and super audible;
    detecting, by an audio capture device, audio transmissions comprising overlapping (i) speech emitted from the source of undesired audio, referred to as an undesired audio signal, and (ii) speech emitted from the source of desired audio, referred to as a desired audio signal;
    converting, by the audio capture device, the audio transmissions into a collective audio signal comprising the audio tag, the desired audio signal and the undesired audio signal;
    receiving, at a processor, the collective audio signal;
    processing the collective audio signal to eliminate the undesired audio signal from the audio signal based on the audio tag; and
    generating a command for an external device based on the collective audio signal with the undesired audio signal eliminated.

13. The audio processing method of claim 12, wherein the audio tag is an externally created audio tag (ECT), and further comprising, responsive to the processor determining that it has access to the source of the undesired audio signal:
- commanding a source of ECT to add the ECT to the undesired audio signal, and
- creating an association between the ECT and the source of undesired audio signal and storing the association.

14. The audio processing method of claim 12, wherein the audio tag is a naturally occurring tag (NT), and further comprising, responsive to the processor determining that it has access to the source of the desired audio signal:
- processing the desired audio signal to identify the naturally occurring tag (NT) therein, and
- creating an association between the NT and the source of the desired audio signal and storing the association.

15. The audio processing method of claim 12, wherein, upon determining that it does not have access to any sources of the audio signal, the processor is further configured to process the audio signal to
- (i) identify a naturally occurring audio tag in the undesired audio signal and associate the naturally occurring audio tag in the undesired audio signal with the source of undesired audio signals, or
- (ii) identify a naturally occurring audio tag in the desired audio signal and associate the naturally occurring audio tag in the desired audio signal with the source of desired audio signals.

* * * * *